United States Patent
Marzolla et al.

(10) Patent No.: US 9,321,913 B2
(45) Date of Patent: Apr. 26, 2016

(54) POLYOLEFIN COMPOSITIONS

(71) Applicant: Basell Poliolefine Italia S.r.l., Milan (IT)

(72) Inventors: Roberta Marzolla, Ferrara (IT); Monica Galvan, Ferrara (IT); Angelo Ferraro, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 0 days.

(21) Appl. No.: 14/352,868

(22) PCT Filed: Oct. 19, 2012

(86) PCT No.: PCT/EP2012/070708
§ 371 (c)(1),
(2) Date: Apr. 18, 2014

(87) PCT Pub. No.: WO2013/057226
PCT Pub. Date: Apr. 25, 2013

(65) Prior Publication Data
US 2014/0336334 A1 Nov. 13, 2014

Related U.S. Application Data

(60) Provisional application No. 61/551,142, filed on Oct. 25, 2011.

(30) Foreign Application Priority Data

Oct. 20, 2011 (EP) ..................... 11185862

(51) Int. Cl.
  C08L 23/00 (2006.01)
  C08L 23/12 (2006.01)
  C08L 23/08 (2006.01)

(52) U.S. Cl.
  CPC ............. *C08L 23/12* (2013.01); *C08L 23/0815* (2013.01); *C08L 2666/06* (2013.01)

(58) Field of Classification Search
  CPC .. C08L 23/12; C08L 23/0815; C08L 2666/06
  See application file for complete search history.

(56) References Cited

U.S. PATENT DOCUMENTS

| | | | |
|---|---|---|---|
| 6,441,094 B1 * | 8/2002 | Cecchin et al. | 525/191 |
| 7,872,074 B2 * | 1/2011 | Massari et al. | 525/191 |
| 8,569,418 B2 * | 10/2013 | Galvan et al. | 525/191 |
| 2009/0171030 A1 | 7/2009 | Ikeda et al. | |
| 2009/0283935 A1 * | 11/2009 | Massari et al. | 264/328.2 |
| 2010/0204369 A1 | 8/2010 | Nozawa | |
| 2010/0255232 A1 | 10/2010 | Duguid et al. | |
| 2012/0171405 A1 * | 7/2012 | Pasquali | B32B 7/12 428/36.9 |

FOREIGN PATENT DOCUMENTS

| | | |
|---|---|---|
| EP | 0170255 A1 | 2/1986 |
| EP | 0373660 A2 | 6/1990 |
| EP | 1135440 B1 | 8/2004 |
| WO | WO2010/149705 A1 | 12/2010 |
| WO | WO2011/003677 * | 3/2011 |

OTHER PUBLICATIONS

PCT International Search Report & Written Opinion mailed Nov. 22, 2012, for PCT/EP2012/070708.

* cited by examiner

*Primary Examiner* — Irina Krylova

(57) ABSTRACT

A polyolefin compositions comprising:
  A) From 77 wt % to 90 wt %, of a propylene homopolymer having the fraction soluble in xylene at 25° C. lower than 2 wt %;
  B) from 10 wt % to 23 wt % of a copolymer of ethylene with one $C_4$-$C_{10}$ alpha-olefin containing from 20 wt % to 30 wt %, of said $C_4$-$C_{10}$ alpha-olefin derived units;
  said composition having
    the value of melt flow rate (MFR) at 230° C., 2.16 kg of from 0.5 to 4.5 g/10 min;
    the total content of ethylene of from 10 wt % to 18 wt %;
    the value of the intrinsic viscosity of the total fraction soluble in Xylene at 25° C. (AMXSIVtot) is less than 1.5 dl/g.

5 Claims, No Drawings

POLYOLEFIN COMPOSITIONS

This application is the U.S. National Phase of PCT International Application PCT/EP2012/070708, filed Oct. 19, 2012, claiming priority of European Patent Application No. 11185862.7, filed Oct. 20, 2011, and the benefit under 35 U.S.C. 119(e) of U.S. Provisional Application No. 61/551,142 filed Oct. 25, 2011, the contents of which are incorporated herein by reference in their entirety.

FIELD OF INVENTION

The present invention concerns polyolefin compositions comprising a propylene homopolymers and a copolymer of ethylene with $C_4$-$C_{10}$ alpha-olefins.

BACKGROUND OF THE INVENTION

The compositions of the present invention can be easily converted into various kinds of finished or semi-finished articles. In particular, the compositions of the present invention are suitable for film applications, particularly for cast films, exhibiting heat seal-ability, retortability and good optical properties (low haze on film) together with high flexural modulus (stiffness). The compositions can be used in particular for those film applications requiring good optical properties and stiffness such as packaging for fresh vegetables, laminated retortable and flexible packaging and clear retortable pouches.

Compositions comprising crystalline polypropylene matrix and a rubbery phase formed by an elastomeric copolymer of ethylene with α-olefins are already known in the art, and described in particular in European patents 170 255, 373660, 603723, and 1135440 and in the International Application WO 2008/061843.

Said compositions exhibit impact resistance and, in the case of European patents 373660, 603723 and 1135440, transparency values interesting for many applications. However the overall balance of properties is still not totally satisfactory in the whole range of possible applications, in view of the high standards required by the market.

WO 2010/149705 relates to a polyolefin composition formed by a matrix that can be homopolymer or a random copolymer and a rubbery phase comprising an ethylene/1-butene copolymer. In particular this composition has a Melt flow rate (MFR) measured at 230° C. and 2.16 kg of load ranging from 5 to 10 g/10 min.

SUMMARY OF THE INVENTION

The applicant found that by fine tuning the MFR, the amount of rubber and the rubber composition it is possible to improve the retorting properties of the polyolefin composition. In particular the peeling strength of the packages both before and after the thermal treatment can be improved.

Therefore, an object of the present invention is a polyolefin compositions comprising:
A) From 77 wt % to 90 wt %, preferably from 80 wt % to 89 wt %, more preferably from 82 wt % to 88 wt % of a propylene homopolymer having the fraction soluble in xylene at 25° C. lower than 2.5 wt %;
B) from 10 wt % to 23 wt % preferably from 11 wt % to 17 wt %; more preferably from 12 wt % to 16 wt % of a copolymer of ethylene with one $C_4$-$C_{10}$ alpha-olefin containing from 20 wt % to 30 wt %, preferably from 22 wt % to 28 wt %, more preferably from 24 wt % to 27 wt % of said $C_4$-$C_{10}$ alpha-olefin derived units;
the sum A+B being 100;
said composition having
the value of melt flow rate (MFR) at 230° C., 2.16 kg of from 0.5 to 4.5 g/10 min; preferably of from 1.0 to 4.0 g/10 min; more preferably from 1.0 to 3.0 g/10 min;
the total content of ethylene of from 7 wt % to 18 wt %, preferably from 9 wt % to 15 wt %,
the value of the intrinsic viscosity of the total amorphous fraction soluble in Xylene at 25° C. (AMXSIVtot) is less than 1.5 dl/g, preferably from 1.0 dl/g to 1.4 dl/g, more preferably of from 1.0 to 1.3 dl/g.

DETAILED DESCRIPTION OF THE INVENTION

Preferably the polyolefin composition is further endowed with one or more of the followings properties:
the total content of $C_4$-$C_{10}$ α-olefin of from 2 wt % to 7 wt %, preferably from 3 wt % to 6 wt %, more preferably of from 3 wt % to 5 wt %.
the ratio (XStot/XSm) of the total fraction soluble in Xylene at 25° C. to the fraction soluble in Xylene at 25° C. of the component (A) of from 3 to 15, preferably of from 4 to 8.
the MFR (at 230° C., 2.16 Kg) of component A) is from 1 to 4 g/10 min, preferably of from 1 to 2 g/10 min.
the total fraction soluble in Xylene at 25° C. (XStot) of less than 20 wt % or less, preferably of 18 wt % or less, more preferably of from 9 wt % to 13 wt %
the flexural modulus of more than 900 MPa, more preferably more than 1000 MPa, even more preferably more than 1300 MPa;

Throughout the present Specification the term "copolymer" is meant to include only polymer containing two kind of comonomers.

XStot is the total fraction soluble in Xylene at 25° C. in percent by weight with respect to the sum of the component (A) and the component (B). XSm is the fraction soluble in Xylene at 25° C. of component (A) in percent by weight referred to the component (A).

The compositions of the present invention provide in particular a combination of high flexural modulus, excellent transparency on films (low haze).

In particular the composition of the present invention shows high values of peeling strength after the thermal sterilization in the retorting process.

The retorting process is a thermal process aiming to obtain sterilization by the application of heat. The sterilization can be defined as an inactivation of organisms of significance to both public health and spoilage under normal conditions of storage. This is necessary for food packaging in order to, for example, extend the shelf life of the food.

After the retorting process usually the film shows a deterioration of mechanical properties in particular of the peel strength that becomes lower. It is possible therefore to define a "delta peel strength" at various sealing temperatures that can measure this deterioration. With the composition of the present invention the "delta peel strength" is considerably low.

The $C_4$-$C_{10}$ alpha-olefins are represented by the formula $CH_2$=CHR, wherein R is an alkyl radical, linear or branched, with 2-8 carbon atoms.

Examples of said $C_4$-$C_{10}$ alpha-olefins are 1-butene, 1-pentene, 1-hexene, 4-methyl-1-pentene and 1-octene. Particularly preferred is 1-butene.

The compositions of the present invention can be prepared by a sequential polymerization, comprising at least two sequential steps, wherein components A) and B) are prepared in separate subsequent steps, operating in each step, except the first step, in the presence of the polymer formed and the catalyst used in the preceding step. The catalyst is added preferably only in the first step; however its activity is such that it is still active for all the subsequent steps.

Preferably component A) is prepared before component B).

Therefore, the present invention is further directed to a process for the preparation of the polyolefin compositions as reported above, said process comprising at least two sequential polymerization stages with each subsequent polymerization being conducted in the presence of the polymeric material formed in the immediately preceding polymerization reaction, wherein the polymerization stage of propylene to the polymer component A) is carried out in at least one stage, then at least one copolymerization stage of mixtures of ethylene with one $C_4$-$C_{10}$ α-olefin to the elastomeric polymer component B) is carried out. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:
a) Mg, Ti and halogen and an electron donor (internal donor),
b) an alkylaluminum compound and, optionally (but preferably),
c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

Among succinates, they are preferably selected from succinates of formula (I) below:

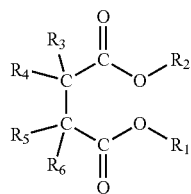

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms;
or of formula (II) below:

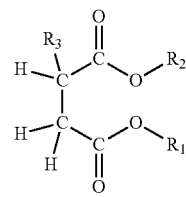

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The external donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

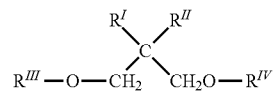

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are C1-C18 hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$ and (cyclopentyl)$_2$Si(OCH$_3$)$_2$.

Preferably the electron donor compound (c) is used in such an amount to give a molar ratio between the organoaluminum compound and said electron donor compound (c) of from 0.1 to 500, more preferably from 1 to 300 and in particular from 3 to 30.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably MgCl$_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are TiCl$_4$ and TiCl$_3$; furthermore, also Ti-haloalcoholates of formula Ti(OR)n-yXy can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound(s) can be added during the treatment with TiCl$_4$.

Regardless of the preparation method used, the final amount of the electron donor compound(s) is preferably such that the molar ratio with respect to the MgCl$_2$ is from 0.01 to 1, more preferably from 0.05 to 0.5.

The catalysts may be precontacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 µm, a flowability of less than 30 seconds and a bulk density (compacted) greater than 0.4 g/ml.

The polymerisation stages may occur in liquid phase, in gas phase or liquid-gas phase. Preferably, the polymerisation of the polymer component 1) is carried out in liquid monomer (e.g. using liquid propylene as diluent), while the copolymerisation stages of the elastomeric copolymer component 2) is carried out in gas phase. Alternatively, all the sequential polymerisation stages can be carried out in gas phase.

The reaction temperature in the polymerisation stage for the preparation of the polymer component 1) and in the preparation of the elastomeric copolymer component 2) may be the same or different, and is preferably from 40 to 100° C.; more preferably, the reaction temperature ranges from 50 to 80° C. in the preparation of polymer component 1), and from 70 to 100° C. for the preparation of polymer component 2).

The pressure of the polymerisation stage to prepare polymer component 1), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the stages depend on the desired ratio between polymer components 1) and 2), and can usually range from 15 minutes to 8 hours. Conventional molecular weight regulators known in the art, such as chain transfer agents (e.g. hydrogen or ZnEt$_2$), may be used.

The compositions of the present invention can also be obtained by preparing separately the said components A) and B), by operating with the same catalysts and substantially under the same polymerization conditions as previously explained (except that a wholly sequential polymerization process will not be carried out, but the said components will be prepared in separate polymerization steps) and then mechanically blending said components in the molten or softened state. Conventional mixing apparatuses, like screw extruders, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as flexural modulus, Heat Distortion Temperature (HDT) and tensile strength at.

Typical examples of nucleating agents are the Na benzoate, talc and the 1,3- and 2,4-dibenzylidenesorbitols.

The nucleating agents are preferably added to the compositions of the present invention in quantities ranging from 0.01 to 2% by weight, more preferably from 0.05 to 1% by weight with respect to the total weight.

The addition of inorganic fillers, such as talc, calcium carbonate and mineral fibers, also brings about an improvement to some mechanical properties, such as flexural modulus and HDT.

The particulars are given in the following examples, which are given to illustrate, without limiting, the present invention.

EXAMPLES

The data relating to the physical-mechanical properties of the final polymer compositions reported in table 2 are obtained from measurements carried out on the so extruded polymers.

The data shown in the tables are obtained by using the following test methods.

Molar Ratios of the Feed Gases

Determined by gas-chromatography.

Ethylene and 1-butene Content of the Polymers

Determined by I.R. spectroscopy by using a Fourier Transform Infrared spectrometer (FTIR).

The spectrum of a pressed film of the polymer is recorded in absorbance vs. wavenumbers (cm−1). The following measurements are used:
Area (At) of the combination absorption bands between 4482 and 3950 cm−1 which is used for spectrometric normalization of film thickness.
Area (AC2) of the absorption band due to methylenic sequences (CH2 rocking vibration) in the range 660 to 790 cm−1 after a proper consecutive digital subtraction of:
  a C2C4 reference spectrum properly treated
  an isotactic polypropylene (IPP) reference spectrum.
The reference subtraction steps can be automated for improved precision.

The factor of subtraction (FCRC4) between the spectrum of the polymer sample and the reference spectrum of the C2C4.

The isotactic polypropylene (IPP) reference spectrum is the spectrum of a isotactic polypropylene film (xylene solubility lower than 3 wt %) 0.5 mm in thickness and be free of interference fringes in the 790-650 cm−1 region.

The C2C4 reference spectrum properly treated is obtained as follows:
a) Collecting and storing the absorbance spectrum of f a xylene soluble fraction of a C2C4 copolymer against an air background. The reference spectrum should be acquired from a film approximately 0.3 mm in thickness and be free of interference fringes in the 850-650 cm−1 region.
b) subtract from the spectrum recorded in a) the spectrum of a polyethylene (homopolymer) about 0.5 mm thick, in order to remove the polyethylene absorptions in the range 805-742 cm−1.
c) Generate a straight line from 805-742 cm−1
d) Subtract the spectrum obtained in (b) minus the spectrum obtained in (c).

The spectrum obtained in (d) has the absorbance values=0 in the whole wavenumber range but 805-742 cm−1.

Two calibration curves have to be obtained:

Ethylene Calibration Curve

A calibration curve is obtained by plotting AC2/At ($A_{C2}$) vs. % C2m (molar fraction) The coefficients $a_{C2}$, $b_{C2}$ and $c_{C2}$ of the calibration $$A_{C2} = a_{C2} \cdot C_{C2m}^2 + b_{C2} \cdot C_{C2m} + C_{C2}$$

are obtained from a regression.

1-Butene Calibration Curve

A calibration curve is obtained by plotting the ratio FCRC4/At ($FCR_{C4}$) vs. % C4m (molar fraction) The coefficients $a_{C4}$, $b_{C4}$ and $c_{C4}$ of the calibration $$FCR_{C4} = a_{C4} \cdot C_{C4m}^2 + b_{C4} \cdot C_{C4m} + c_{C4}$$

are obtained from a regression.

Melt Flow Rate (MFR)

Determined according to ISO 1133, condition L (MFR"L" at 230° C., 2.16 Kg).

Determination of the Total Amorphous Faction Soluble in Xylene at 25° C. (AMXISVtot)

2.5 g of polymer and 250 ml of xylene are introduced in a glass flask equipped with a refrigerator and a magnetical stirrer. The temperature is raised in 30 minutes at 135° C. The so obtained clear solution is then kept under reflux and stirring for further 30 minutes. The closed flask is kept in thermostatic water bath at 25° C. for 30 minutes. The so formed solid is filtered on quick filtering paper and acetone is added to an aliquot of the filtrate to cause the polymer dissolved therein to precipitate. The polymer thus obtained is recovered, washed and dried. On this polymer the intrinsic viscosity (IV) is measured.

Solubility in Xylene at 25° C.: Determined as Follows.

2.5 g of polymer and 250 ml of xylene are introduced in a glass flask equipped with a refrigerator and a magnetic stirrer. The temperature is raised in 30 minutes at 135° C. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 70° C. under vacuum until constant weight is obtained. The weight percentage of polymer soluble in xylene at room temperature is then calculated.

Intrinsic Viscosity (I.V.)

Determined in tetrahydronaphthalene at 135° C.

Thermal Properties (DSC):

Determined by differential scanning calorimetry (DSC). A sample weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

Sample Preparation

Samples for the evaluation of mechanical characteristics are produced according to ISO 294-3

Flexural Modulus

Determined according to ISO 178.

Izod Impact Strength (Notched)

Determined according to ISO180/1A.

Preparation of the Cast Film Specimens

Films with a thickness of 50 μm were prepared by extruding each polymer composition in a single screw Collin extruder (length/diameter ratio of screw: 30) at a film drawing speed of 7 m/min and a melt temperature of 210-250° C.

Haze on Film

Determined on 50 μm thick films of the test composition, prepared as described above. The measurement was carried out on a 50×50 mm portion cut from the central zone of the film.

The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

Gloss on Film

Determined on the same specimens as for the Haze.

The instrument used for the test was a model 1020 Zehntner photometer for incident measurements. The calibration was made by carrying out a measurement at incidence angle of 60° on black glass having a standard Gloss of 96.2% and a measurement at an incidence angle of 45° on black glass having a standard Gloss of 55.4%.

Fish Eyes:

Determined on a 50 μm-thick film specimen prepared as described above. The film is then inspected by means of an optical device (Matrix or Line CCD cameras). Film defects are counted in accordance to their dimension.

Example 1 and Comparative Example 2

In a plant operating continuously according to the mixed liquid-gas polymerization technique, runs were carried out under the conditions specified in Table 1.

The polymerization was carried out in the presence of a catalyst system in a series of two reactors equipped with devices to transfer the product from one reactor to the one immediately next to it.

Preparation of the Solid Catalyst Component

The Ziegler-Natta catalyst was prepared according to the Example 5, lines 48-55 of the European Patent EP728769. Triethylaluminium (TEAL) was used as co-catalyst and dicyclopentyldimethoxysilane as external donor, with the weight ratios indicated in Table 1.

Catalyst System and Prepolymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to prepolymerization by maintaining it in suspension in liquid propylene at 20° C. for about 5 minutes before introducing it into the first polymerization reactor.

Polymerization

The polymerisation run is conducted in continuous in a series of two reactors equipped with devices to transfer the product from one reactor to the one immediately next to it. The first reactor is a liquid phase reactor, and the second reactor is a fluid bed gas phase reactor. Polymer component 1) is prepared in the first reactor, while polymer component 2) is prepared in the second reactor.

Temperature and pressure are maintained constant throughout the course of the reaction. Hydrogen is used as molecular weight regulator.

The gas phase (propylene, ethylene, butene and hydrogen) is continuously analysed via gas-chromatography.

At the end of the run the powder is discharged and dried under a nitrogen flow.

The data relating to Xylene solubles and comonomer content in the final polymer compositions reported in table 1 and 2 are obtained from measurements carried out on the so obtained polymers, stabilized when necessary.

Then the polymer particles are introduced in an extruder, wherein they are mixed with 1500 ppm of Irganox B 215 (made of 1 part of Irganox 1010 and 2 parts of Irgafos 168) and 500 ppm of Ca stearate. The previously said Irganox 1010 is pentaerytrityl tetrakis 3-(3,5-di-tert-butyl-4-hydroxyphenyl) propanoate, while Irgafos 168 is tris (2,4-di-tert-butylphenyl) phosphite, both marketed by Ciba-Geigy. The polymer particles are extruded under nitrogen atmosphere in a twin screw extruder, at a rotation speed of 250 rpm and a melt temperature of 200-250° C.

TABLE 1

| Polymerization Process | | | |
|---|---|---|---|
| | | Example | |
| | | 1 | Comp 2 |
| TEAL/solid catalyst component | weight ratio | 7 | 7 |
| TEAL/DCPMS | molar ratio | 4.3 | 5 |
| liquid phase reactor: propylene homopolymer matrix component A) | | | |
| Polymerisation temperature, | ° C. | 75 | 70 |
| Pressure, | Mpa | 39.5 | 36 |
| Residence time, | min | 80 | 68 |
| H$_2$ feed | mol ppm | 900 | 1950 |
| MFR "L" | g/10 min | 1.8 | 3.5 |
| Split | wt % | 86 | 82 |
| gas phase reactor - ethylene-butene-1 copolymer rubber component B) | | | |
| Polymerisation temperature, | ° C. | 85 | 85 |
| Pressure, | bar | 14 | 15 |
| Residence time, | min | 10 | 10 |
| H$_2$/C$_2^-$ | mol ratio | 0.25 | 0.23 |
| C$_4^-$/(C$_4^-$ + C$_2^-$) | Mol ratio | 0.46 | 0.48 |
| Split | wt % | 14 | 18 |

H$_2$ feed = calculated with respect to the molar flow of propylene;
C$_2^-$ = ethylene;
C$_3^-$ = propylene;
C$_4^-$ = butene-1

TABLE 2

| | | Examples | |
|---|---|---|---|
| | | 1 | Comp 2 |
| Component A | | | |
| MFR | g/10 min | 1.6 | 3.5 |
| XSm | % | 1.5 | 1.8 |
| Tm | °C. | | |
| Split | wt % | 86 | 82 |
| Component B | | | |
| Split | wt % | 14 | 18 |
| Ethylene content# | wt % | 75 | 75 |
| Butene-1 content# | wt % | 25 | 25 |

TABLE 2-continued

| | | Examples | |
|---|---|---|---|
| | | 1 | Comp 2 |
| Composition | | | |
| MFR "L" | g/10 min | 1.8 | 4.0 |
| XStot | wt % | 11.5 | 14.2 |
| XStot/XSm | | 7.7 | 8..1 |
| AMXSIVtot | dl/g | 1.18 | 1.6 |
| Ethylene content | wt % | 10.5 | 13.5 |
| Butene-1 content | wt % | 3.5 | 4.5 |
| Properties | | | |
| Flexural modulus | MPa | 1384 | 1260 |
| Izod impact resistance at 23° C. | kJ/m$^2$ | 31.3 | 14 |
| Characterization on cast film 50μ | | | |
| Haze on cast film (50 μm) | % | 9.4 | 17.2 |
| Gloss on cast film (50 μm) at 45° | % | 64.3 | 40.6 | calculated

Sealing Curves

Films of the polymers of example 1, 2 and comparative example 3 with a thickness of 80 μm are prepared by extruding each test composition in a single screw Collin extruder (length/diameter ratio of screw 1:25) at a film drawing speed of 7 m/min and a melt temperature do 210-250° C.

The resulting film is superimposed on a 20 μm thick two layers film of Al and PET. The superimposed films are bonded to each other in a Carver press at 200° C. under a 9000 kg load, which is maintained for 5 minutes. 2×5 cm specimens are cut from the films. The resulting laminates PP/Al/PET are then tested.

Determination of the Sealing Curves.

For each test two of the same specimens (cast film 100 micron) are superimposed in alignment, the adjacent layers being PP layers wherein PP is the film of the polymers of examples 1, 2 and comparative example 3. The superimposed specimens are sealed with a RDM HSE-3 multi Seal instrument. Sealing time is 1.2 seconds at a pressure of 5 Bars. The sealing temperature is increased of 10° C. for each seal, starting from 150° C. The sealed samples are left to cool and then the seals are tested after 24 hrs conditioning time at 23° C. and 50% RH. Their unsealed ends are attached to an Instron machine where they are tested at a traction speed of 100 mm/min. After plotting the seal strength (N/mm) in function of temperature a sealing curve is obtained.

Samples of the same films are placed on Systec DX-65 autoclave for thermal treatment performed at 130° C. per 60 minutes and then the sealing curve is obtained according to the above method.

Table 3 shows the seal strength before and after the thermal treatment

TABLE 3

| Sealing temperature | °C. | 150 | 160 | 170 | 180 | 190 | 200 |
|---|---|---|---|---|---|---|---|
| Ex 1 seal strength | N | 27.30 | 54.20 | 55.60 | 57.30 | 59.70 | 60.20 |
| Ex 1 thermal treated seal strength | N | 21.10 | 46.30 | 48.70 | 49.80 | 50.80 | 52.50 |
| Δ delta peel strength | N | 6.20 | 7.90 | 6.90 | 7.50 | 8.90 | 7.70 |
| Comp Ex 2 seal strength | N | 36.30 | 39.80 | 37.70 | 41.80 | 52.00 | 58.10 |
| Comp Ex 2 thermal treated seal strength | N | 26.40 | 30.60 | 28.50 | 29.70 | 42.30 | 50.50 |
| Δ delta peel strength | N | 9.90 | 9.20 | 9.20 | 12.10 | 9.70 | 7.60 |

The difference (Δ) between the sealing strength before and after the thermal treatment for the films obtained in example 1 are considerably lower with respect to the films obtained with the polymer of comparative example 2.

What is claimed is:

1. A polyolefin compositions comprising:
    A) 77% to 90% by weight of a propylene homopolymer having the fraction soluble in xylene at 25° C. from 1.5 to 2% by weight and a melt flow rate (MFR) of 1 to 1.6 g/10 min;
    B) 10% to 23% by weight, of a copolymer of ethylene and at least one $C_4$-$C_{10}$ alpha-olefin, wherein the copolymer comprises from 22% to 28% by weight of the at least one $C_4$-$C_{10}$ alpha-olefin derived unit;
    wherein the polyolefin composition has:
    a melt flow rate (MFR) at 230° C., 2.16 kg from 1.0 to 2.0 g/10 min;
    a total content of ethylene derived units ranging from 9% to 15% by weight;
    a intrinsic viscosity from 1.18 to 1.5 dl/g, based upon a total amorphous fraction soluble in xylene at 25° C.; and
    a flexural modulus of higher than 1300 to 1384 MPa.

2. A film comprising a polyolefin composition comprising:
    A) 77% to 90% by weight of a propylene homopolymer having a fraction soluble in xylene at 25° C. from 1.5 to 2 wt % and a melt flow rate (MFR) of 1 to 1.6 g/10 min;
    B) 10% to 23% by weight of a copolymer of ethylene and at least one $C_4$-$C_{10}$ alpha-olefin, wherein the copolymer comprises from 22% to 28% by weight of the at least one $C_4$-$C_{10}$ alpha-olefin derived unit;
    wherein the polyolefin composition has:
    a melt flow rate (MFR) at 230° C., 2.16 kg from 1.0 to 2.0 g/10 min;
    a total content of ethylene derived units ranging from 9% to 15% by weight;
    a intrinsic viscosity from 1.18 to 1.5 dl/g, based upon a total amorphous fraction soluble in xylene at 25° C.; and
    a flexural modulus of higher than 1300 to 1384 MPa.

3. The film of claim 2, wherein the film is a multilayer film.

4. The film of claim 2, wherein the film is subjected to a retorting process.

5. The film of claim 4, wherein the retorting process comprises the step of heating the film.

\* \* \* \* \*